M. M. STILWELL.
STEREOSCOPIC ATTACHMENT FOR CAMERAS.
APPLICATION FILED JUNE 28, 1920.
1,408,654.
Patented Mar. 7, 1922.
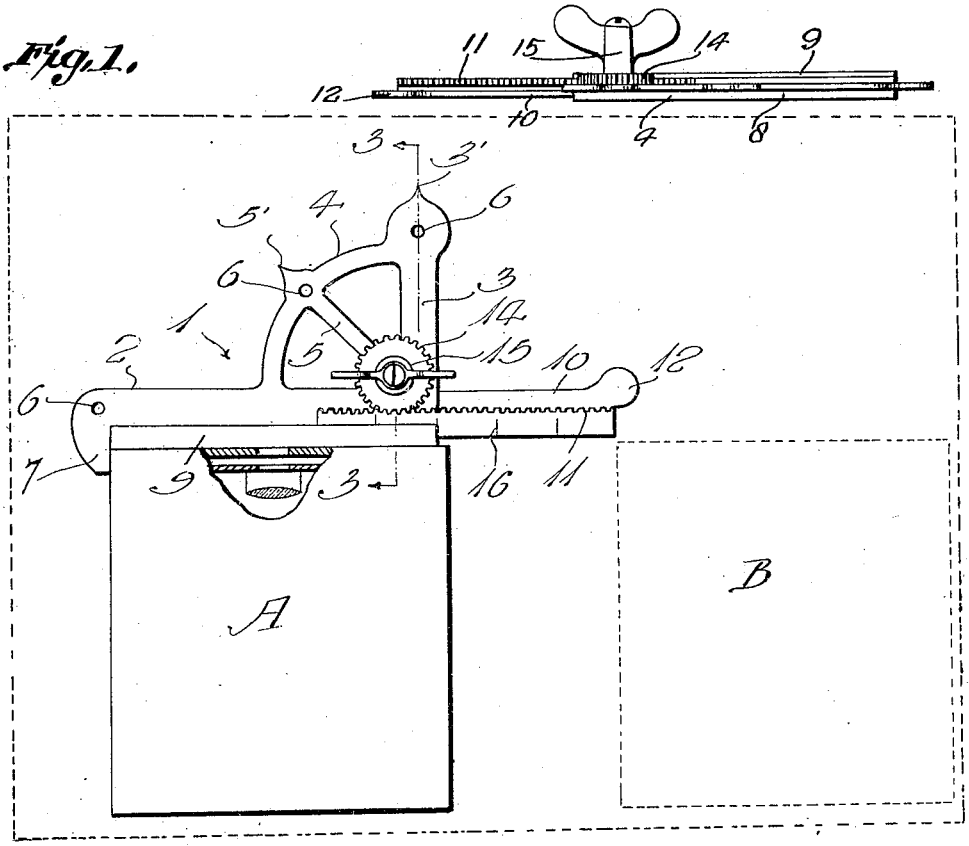
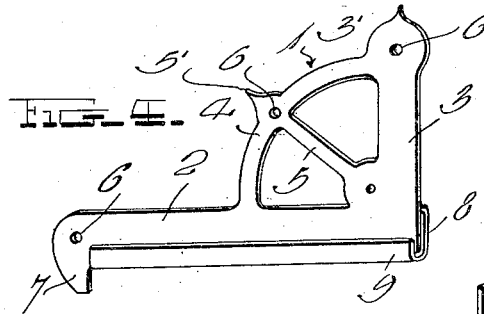
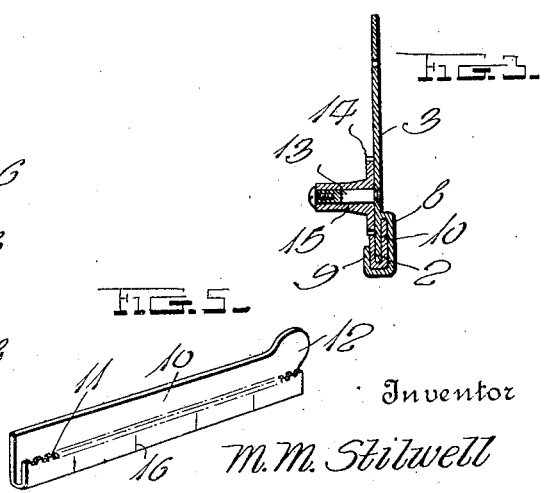
Inventor
M. M. Stilwell
Witness
H. Woodard
By H. B. Wilson &co
Attorneys

UNITED STATES PATENT OFFICE.

MILTON M. STILWELL, OF NEW YORK, N. Y.

STEREOSCOPIC ATTACHMENT FOR CAMERAS.

1,408,654. Specification of Letters Patent. Patented Mar. 7, 1922.

Application filed June 28, 1920. Serial No. 392,253.

*To all whom it may concern:*

Be it known that I, MILTON M. STILWELL, a citizen of the United States, residing at New York, in the county of New York and State of New York, have invented certain new and useful Improvements in Stereoscopic Attachments for Cameras; and I do declare the following to be a full, clear, and exact description of the invention, such as will enable others skilled in the art to which it appertains to make and use the same.

This invention relates generally to photographic camera appurtenances and more particularly to devices designed for use in making photographs for stereoscopes.

Heretofore, the double or apparently duplicate photographs for stereoscopes have been made simultaneously by either double cameras or duplicate cameras, and the photographs so made have proved very satisfactory, but have not been perfect, for the reason that it is an absolute impossibility to make lenses which are exact duplicates and for this reason the double or duplicate photographs cannot be made the same in all respects except the difference in position from which said duplicates are made. To overcome this difficulty, single cameras, that is, cameras provided with single bodies, lenses and shutters, have been used and placed in one position to take one of the photographs and in another position to take the other or duplicate photograph. This method of taking photographs for use in connection with a stereoscope is very desirable, as the same camera with the same lens is used for making the duplicate photograph. Difficulty is, however, experienced, when taking a number of photographs for the stereoscope, and obtaining in the photographs the same amount or degree of relief. The present invention is directed to this feature of stereoscope photography and consists of an indicator adapted to be used to locate a camera when making duplicate photographs at proper distances apart for the two exposures. The device is of extremely simple, strong, durable and inexpensive construction and is well adapted to the purpose for which it is designed.

With the above and other objects in view, the invention consists of the novel features of construction, and the combination and arrangement of parts as are hereinafter fully described and claimed.

The accompanying drawing illustrates a preferred form of the invention, and in this drawing Figure 1 is a plan view thereof, the two positions of the camera for taking duplicate photographs being indicated.

Figure 2 is a view showing the device in elevation.

Fig. 3 is a detail sectional view thereof, taken substantially on the line 3—3 of Fig. 1.

Fig. 4 is a perspective view of one member of the device.

Fig. 5 is a similar view of another member thereof.

As indicated above, the principles of the invention may be worked out in various ways, but the device as shown in the drawing is suitable for all purposes and is preferred over other simpler and more complex forms. The device as shown in the drawing consists of a member 1, which is stamped or otherwise cut from a flat plate of sheet metal or other suitable material, and it is shaped to contain a straight bar 2, another straight bar 3 extending laterally from one end of the bar 2, a curved bar 4 connecting the free end of the bar 3 with the intermediate portion of the bar 2, and a diagonal bar 5 connecting the intermediate portion of the curved bar 4 and the bars 2 and 3 at their junction. The ends of the bars 2 and 3 remote from their ends which are joined together, and the bar 4 at its point of connection with the bar 5, are provided with apertures 6, the purposes of which are hereinafter described. The end of the bar 2 adjacent its aperture 6 is provided with a laterally extending finger or indicating element 7. This indicating element 7 extends in a direction from the bar 2 opposite to the direction in which the bar 3 extends. Formed at the outer edge of the bar 4 adjacent the latter's intersection with the bars 3 and 5 are points 3' and 5', the point 3' extending in the direction of the bar 3 and the point 5' extending in the direction of the bar 5. All the parts just described are formed integral, a part of the flat plate 1.

Soldered or otherwise suitably secured to the back of the plate 1, preferably adjacent and along one edge of the bar 2 is a plate 8, the latter being of substantially J-shaped configuration in cross section, and having its widest side slightly spaced from the back of the bar 2. The intermediate portion of the plate 8 passes around the opposite edge of the bar 2 and the narrowest side 9 of the plate 8 is disposed in slightly spaced relation from the front of the bar 2. This arrangement provides a subtantially J-shaped cross sectional space around the bar 2 and between it and the plate 8.

This space is constructed in this way so as to receive a slide 10, which as clearly shown, is of substantially J-shaped configuration in cross section. The narrowest side of the slide 10 is provided with a series of rack teeth 11 on its free edge, and the widest side of the slide 10 at one end is provided with a finger or indicating element 12.

Revolubly mounted upon a pintle 13 secured at one end to the plate 1 preferably at the juncture of the bars 2, 3 and 5, and projecting laterally from the front of the plate 1, is a pinion 14 meshing with the rack teeth 11 and having its hub portion 15 provided with wings or adapted in any suitable manner to be easily manually rotated. By rotating the pinion 14, the slide 10 will be moved relatively to the bar 2. In this way, the distance between the indicating elements 7 and 12 can be varied.

In order to determine at a glance the degree of adjustment of the slide 10 with respect to the bar 2, the narrowest side of the slide 10 is provided on its outer surface with a series of graduations 16, certain of which may or may not as is desired, be numbered or lettered.

The device is used when making double or apparently duplicate photographs with an ordinary single lens camera for use in a stereoscope, and in using it it may, when the camera is to be rested upon a flat support, be placed upon said support and prevented from shifting by passing thumb tacks or other suitable securing elements through the aperture 6 and into the flat support. The camera is then placed upon the support so that one corner or side rests against the indicating element 7. In Fig. 1 of the drawing the letter "A" indicates the first position of the camera. After the first exposure has been made and the film shifted, the pinion 14 is operated so that the slide 10 is moved and the indicating element 12 is adjusted to the proper distance from the element 7 for the second exposure. When this has been done, the camera is shifted so that the same corner or side which was opposite the element 7 in the first position is now opposite the element 12 in the second position, the second position of the camera being indicated by the letter "B." The second exposure is then taken.

Instead of first placing the device upon the support and then placing the camera in position with respect to the device, the camera may be placed on the support and the first exposure made, and then the device may be placed in proper position to the camera, the slide adjusted, and the camera moved to the position for the second exposure.

Where the ordinary degree of relief is to be obtained, the camera is pointed in the direction indicated by the point 3', but if an unusual degree of relief of a particular object is to be obtained the camera is pointed in its second position in the direction indicated by the point 5' or any desired degree with respect thereto, care being taken to retain the object in the finder of the camera.

If no flat support or other support for the camera is used, but it is to be held by the photographer in taking snapshots or instantaneous pictures, the device may be pinned to the clothing of the photographer to indicate the degree the camera should be shifted when making the double exposures. The apertures 6 would then serve to receive the pins by which the device is pinned to the clothing of the photographer.

It is believed that the advantages of using such a device are apparent. It is however, to be pointed out that the device enables a single camera, that is, a camera having a single body and a single lens, to be used in making the double or apparently duplicate photographs for use in connection with a stereoscope. The purpose of the device is to obtain the same amount or degree of relief in making a number of photographs. After making one set of duplicate photographs and the distance that the camera was apart in making both exposures is known, the camera may be maintained the same distance apart in making other photographs by ascertaining the mark on the scale or graduations 16 and always setting the slide 10 to this position. The article may be manufactured at a very small cost, and it will enable a person with the aid of an ordinary single lens camera to duplicate the stereoscopic relief heretofore obtained by very expensive and complicated stereo cameras. By the device the same degree of relief may be obtained in a number of stereoscopic photographs, even though the exposures are made at comparatively great intervals of time apart. Not only the natural stereoscopic relief can be obtained by using the device, but also an extraordinary degree of relief can be obtained when desired where the photographs are to be used for amusement purposes or to very clearly show and indicate some particular part of a building, machine, landscape, medical operation, or the like. Such extraordinary degree of relief cannot be obtained by ordinary stereo cameras.

Various changes in form, proportion, and in the minor details of construction may be resorted to without departing from the spirit of the invention as defined in the appended claims.

What is claimed is:—

1. A device of the class described comprising a member provided with an indicating element, another member slidably carried by the first member and provided with an indicating element adapted to be spaced from the indicating element of the first member, and means carried by the first member for imparting movement to the second member to space the indicating elements a predetermined distance apart.

2. A device of the class described comprising a pair of relatively movable members, each provided with an indicating element, a manually operated pinion mounted upon one member, and a rack mounted upon the other member and engaged by said pinion whereby said other member may be adjusted with respect to the first member when said pinion is operated.

3. A device of the class described comprising a flat bar provided at one end with an indicating element, a plate of J-shaped configuration in cross section secured at one edge to one side of said bar and passing around one edge of the latter to provide between said bar and said plate a J-shaped space, a slide of J-shaped configuration in cross section mounted in said space, and an indicating element carried by said slide.

4. A device of the class described comprising a pair of right angularly arranged straight bars, a curved bar connecting one of said straight bars to the intermediate portion of the other straight bar, another bar connecting the intermediate portion of said curved bar with said straight bars at their junction, an indicating element extending laterally from one edge of one of said straight bars, a slide movably mounted upon this straight bar, and an indicating element carried by said slide.

In testimony whereof I have hereunto set my hand.

MILTON M. STILWELL.

Witness:
 ALEXANDER NEWMARK.